(12) United States Patent
Floyd

(10) Patent No.: US 8,098,431 B2
(45) Date of Patent: Jan. 17, 2012

(54) METHOD AND DEVICE FOR GENERATING WHITE IN AN INTERFEROMETRIC MODULATOR DISPLAY

(75) Inventor: Philip D. Floyd, Redwood City, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 70 days.

(21) Appl. No.: 12/427,670

(22) Filed: Apr. 21, 2009

(65) Prior Publication Data

US 2009/0296191 A1    Dec. 3, 2009

Related U.S. Application Data

(63) Continuation of application No. 11/188,197, filed on Jul. 22, 2005, now Pat. No. 7,525,730.

(60) Provisional application No. 60/613,504, filed on Sep. 27, 2004.

(51) Int. Cl.
*G02B 26/00* (2006.01)

(52) U.S. Cl. ........ 359/578; 359/290; 359/291; 359/292; 359/295; 359/298; 359/224; 359/584; 359/590; 359/196; 345/85; 348/770; 348/771

(58) Field of Classification Search .......... 359/290–292, 359/295, 298, 223, 224, 196, 577–580, 584–589, 359/590; 345/85; 348/770, 771
See application file for complete search history.

(56) References Cited

U.S. PATENT DOCUMENTS

| | | | |
|---|---|---|---|
| 3,448,334 A | 6/1969 | Frost | |
| 3,725,868 A | 4/1973 | Malmer, Jr. et al. | |
| 4,441,791 A | 4/1984 | Hornbeck | |
| 4,705,361 A | 11/1987 | Frazier et al. | |
| 4,822,993 A | 4/1989 | Dillon et al. | |
| 4,878,741 A | 11/1989 | Fergason | |
| 4,929,061 A | 5/1990 | Tominaga et al. | |
| 5,136,669 A | 8/1992 | Gerdt | |
| 5,142,414 A | 8/1992 | Koehler | |
| 5,168,406 A | 12/1992 | Nelson | |
| 5,311,360 A | 5/1994 | Bloom et al. | |

(Continued)

FOREIGN PATENT DOCUMENTS

CN    1409157 A    4/2003

(Continued)

OTHER PUBLICATIONS

"CIE Color System," from website hyperphysics.phy-astr.gsu.edu/hbase/vision.cie.html. Article provided as information only. No date available. (as cited by examiner).

(Continued)

*Primary Examiner* — Evelyn A. Lester
(74) *Attorney, Agent, or Firm* — Knobbe Martens Olson & Bear LLP

(57) ABSTRACT

Various embodiments of the invention relate to methods and systems for generating the color white in displays created from interferometric modulators and more specifically, to the generation of the color white through the use of reflected light at two wavelengths. In one embodiment, a display device displays the color white. The color white is generated by reflecting light from two pluralities of interferometric modulator types. The first modulator type reflects colored light at a specific wavelength. The second modulator type reflects colored light selected to be at a wavelength complementary to the first. The combined light reflected from the two types appears white in the display.

21 Claims, 11 Drawing Sheets

U.S. PATENT DOCUMENTS

| | | | |
|---|---|---|---|
| 5,327,263 A | 7/1994 | Katagiri |
| 5,345,322 A | 9/1994 | Fergason et al. |
| 5,452,024 A | 9/1995 | Sampsell |
| 5,589,852 A | 12/1996 | Thompson et al. |
| 5,619,059 A | 4/1997 | Li et al. |
| 5,638,084 A | 6/1997 | Kalt |
| 5,737,115 A | 4/1998 | Mackinlay et al. |
| 5,771,321 A | 6/1998 | Stern |
| 5,835,255 A | 11/1998 | Miles |
| 5,853,310 A | 12/1998 | Nishimura |
| 5,914,804 A | 6/1999 | Goossen |
| 5,959,763 A | 9/1999 | Bozler et al. |
| 5,986,796 A | 11/1999 | Miles et al. |
| 6,028,690 A | 2/2000 | Carter et al. |
| 6,031,653 A | 2/2000 | Wang |
| 6,040,937 A | 3/2000 | Miles |
| 6,055,090 A | 4/2000 | Miles |
| 6,057,878 A | 5/2000 | Ogiwara |
| 6,088,102 A | 7/2000 | Manhart |
| 6,137,904 A | 10/2000 | Lubin et al. |
| 6,147,728 A | 11/2000 | Okumura |
| 6,195,196 B1 | 2/2001 | Kimura et al. |
| 6,213,615 B1 | 4/2001 | Siltari |
| 6,229,916 B1 | 5/2001 | Ohkubo |
| 6,301,000 B1 | 10/2001 | Johnson |
| 6,323,834 B1 | 11/2001 | Colgan et al. |
| 6,342,970 B1 | 1/2002 | Sperger et al. |
| 6,356,378 B1 | 3/2002 | Huibers |
| 6,400,738 B1 | 6/2002 | Tucker |
| 6,421,054 B1 | 7/2002 | Hill et al. |
| 6,570,584 B1 | 5/2003 | Cok et al. |
| 6,597,419 B1 | 7/2003 | Okada et al. |
| 6,643,069 B2 | 11/2003 | Dewald |
| 6,650,455 B2 | 11/2003 | Miles |
| 6,657,611 B1 | 12/2003 | Sterken |
| 6,674,562 B1 | 1/2004 | Miles |
| 6,680,792 B2 | 1/2004 | Miles |
| 6,747,785 B2 | 6/2004 | Chen et al. |
| 6,760,146 B2 | 7/2004 | Ikeda et al. |
| 6,768,555 B2 | 7/2004 | Chen et al. |
| 6,798,469 B2 | 9/2004 | Kimura |
| 6,806,924 B2 | 10/2004 | Niiyama |
| 6,822,780 B1 | 11/2004 | Long |
| 6,825,969 B2 | 11/2004 | Chen |
| 6,862,029 B1 | 3/2005 | D'Souza et al. |
| 6,867,896 B2 | 3/2005 | Miles |
| 6,912,022 B2 | 6/2005 | Lin |
| 6,930,816 B2 | 8/2005 | Mochizuki |
| 6,982,820 B2 | 1/2006 | Tsai |
| 6,995,890 B2 | 2/2006 | Lin et al. |
| 7,006,272 B2 | 2/2006 | Tsai |
| 7,016,095 B2 | 3/2006 | Lin |
| 7,025,464 B2 | 4/2006 | Beeson et al. |
| 7,034,981 B2 | 4/2006 | Makigaki |
| 7,038,752 B2 | 5/2006 | Lin |
| 7,042,643 B2 | 5/2006 | Miles |
| 7,072,093 B2 | 7/2006 | Piehl et al. |
| 7,110,158 B2 | 9/2006 | Miles |
| 7,113,339 B2 | 9/2006 | Taguchi et al. |
| 7,123,216 B1 | 10/2006 | Miles |
| 7,126,738 B2 | 10/2006 | Miles |
| 7,161,728 B2 | 1/2007 | Sampsell et al. |
| 7,172,915 B2 | 2/2007 | Lin et al. |
| 7,176,861 B2 | 2/2007 | Dedene et al. |
| 7,198,873 B2 | 4/2007 | Lin et al. |
| 7,271,790 B2 | 9/2007 | Hudson et al. |
| 7,304,784 B2 | 12/2007 | Chui |
| 7,483,197 B2 | 1/2009 | Miles |
| 7,486,429 B2 | 2/2009 | Chui |
| 7,489,428 B2 | 2/2009 | Sampsell |
| 7,525,730 B2 * | 4/2009 | Floyd ........................ 359/578 |
| 7,595,811 B2 | 9/2009 | Matsuda |
| 7,660,028 B2 | 2/2010 | Lan |
| 7,710,632 B2 | 5/2010 | Cummings |
| 7,742,034 B2 | 6/2010 | Jak et al. |
| 7,898,521 B2 | 3/2011 | Gally |
| 7,911,428 B2 | 3/2011 | Gally |
| 2001/0055208 A1 | 12/2001 | Kimura |
| 2002/0006044 A1 | 1/2002 | Harbers |
| 2002/0054424 A1 | 5/2002 | Miles |
| 2002/0154215 A1 | 10/2002 | Schechterman |
| 2002/0191130 A1 | 12/2002 | Liang et al. |
| 2003/0043157 A1 | 3/2003 | Miles |
| 2003/0151821 A1 | 8/2003 | Favalora et al. |
| 2003/0179383 A1 | 9/2003 | Chen |
| 2003/0214621 A1 | 11/2003 | Kim et al. |
| 2004/0051929 A1 | 3/2004 | Sampsell et al. |
| 2004/0066477 A1 | 4/2004 | Morimoto et al. |
| 2004/0080807 A1 | 4/2004 | Chen et al. |
| 2004/0100594 A1 | 5/2004 | Huibers |
| 2004/0113875 A1 | 6/2004 | Miller et al. |
| 2004/0114242 A1 | 6/2004 | Sharp |
| 2004/0115339 A1 | 6/2004 | Ito |
| 2004/0188599 A1 | 9/2004 | Viktorovitch |
| 2004/0209195 A1 | 10/2004 | Lin |
| 2004/0217919 A1 | 11/2004 | Piehl et al. |
| 2004/0218251 A1 | 11/2004 | Piehl et al. |
| 2004/0233503 A1 | 11/2004 | Kimura |
| 2004/0240032 A1 | 12/2004 | Miles |
| 2005/0002082 A1 | 1/2005 | Miles |
| 2005/0046919 A1 | 3/2005 | Taguchi et al. |
| 2005/0069209 A1 | 3/2005 | Damera-Venkata et al. |
| 2005/0083352 A1 | 4/2005 | Higgins |
| 2005/0195462 A1 | 9/2005 | Lin |
| 2006/0066541 A1 | 3/2006 | Gally |
| 2006/0066557 A1 | 3/2006 | Floyd |
| 2006/0066641 A1 | 3/2006 | Gally et al. |
| 2006/0066935 A1 | 3/2006 | Cummings |
| 2006/0067651 A1 | 3/2006 | Chui |
| 2006/0077124 A1 | 4/2006 | Gally et al. |
| 2006/0077127 A1 | 4/2006 | Sampsell et al. |
| 2006/0077148 A1 | 4/2006 | Gally et al. |
| 2006/0077149 A1 | 4/2006 | Gally et al. |
| 2006/0077512 A1 | 4/2006 | Cummings |
| 2006/0103912 A1 | 5/2006 | Katoh |
| 2006/0250337 A1 | 11/2006 | Miles |
| 2007/0031097 A1 | 2/2007 | Heikenfeld et al. |
| 2007/0085789 A1 | 4/2007 | De Vaan |
| 2007/0247704 A1 | 10/2007 | Mignard |
| 2008/0112031 A1 | 5/2008 | Gally |
| 2008/0143844 A1 | 6/2008 | Innocent |
| 2008/0288225 A1 | 11/2008 | Djordjev |
| 2009/0219604 A1 | 9/2009 | Miles |
| 2010/0014148 A1 | 1/2010 | Djordjev |
| 2010/0103186 A1 | 4/2010 | Luengen et al. |
| 2010/0220109 A1 | 9/2010 | Aoki et al. |
| 2010/0245975 A1 | 9/2010 | Cummings |
| 2011/0043889 A1 | 2/2011 | Mignard |
| 2011/0128307 A1 | 6/2011 | Gally et al. |
| 2011/0141163 A1 | 6/2011 | Gally et al. |
| 2011/0148751 A1 | 6/2011 | Gally et al. |

FOREIGN PATENT DOCUMENTS

| | | |
|---|---|---|
| EP | 0 366 117 | 5/1990 |
| EP | 0 366 181 | 5/1990 |
| EP | 0389031 A1 | 9/1990 |
| EP | 0 330 361 | 4/1993 |
| EP | 0 695 959 | 2/1996 |
| EP | 0786911 A2 | 7/1997 |
| EP | 0830032 A2 | 3/1998 |
| EP | 1 205 782 | 5/2002 |
| EP | 1298635 | 4/2003 |
| EP | 1 640 761 | 3/2006 |
| EP | 1 640 767 | 3/2006 |
| EP | 1640 762 | 3/2006 |
| EP | 1 767 981 | 3/2007 |
| FR | 2760559 A1 | 9/1998 |
| GB | 2 315 356 | 1/1998 |
| GB | 2321532 A | 7/1998 |
| JP | 02-068513 | 3/1990 |
| JP | 05-281479 | 10/1993 |
| JP | 08 018990 | 1/1996 |
| JP | 8018990 | 1/1996 |
| JP | 09-189910 | 7/1997 |
| JP | 09 281917 | 10/1997 |
| JP | 09281917 | 10/1997 |
| JP | 10 319877 | 12/1998 |

| | | |
|---|---|---|
| JP | 11 211999 | 8/1999 |
| JP | 2000 500245 | 1/2000 |
| JP | 2002-062505 | 2/2002 |
| JP | 2002 062505 A | 2/2002 |
| JP | 2002-149116 | 5/2002 |
| JP | 2002-229023 | 8/2002 |
| JP | 2003-021821 A | 1/2003 |
| JP | 2003 255324 | 9/2003 |
| JP | 2003 255379 | 9/2003 |
| JP | 2003 295160 | 10/2003 |
| JP | 2003-315732 | 11/2003 |
| JP | 2004-117815 | 4/2004 |
| JP | 2004-212673 | 7/2004 |
| JP | 2004-212922 | 7/2004 |
| JP | 2004-534280 A | 11/2004 |
| JP | 2005-527861 | 9/2005 |
| KR | 2002 010322 | 2/2002 |
| KR | 2010322 | 2/2002 |
| WO | WO 95/30924 A1 | 11/1995 |
| WO | WO 96/08833 | 3/1996 |
| WO | WO 97/17628 A1 | 5/1997 |
| WO | WO 99/52006 A2 | 10/1999 |
| WO | WO 03/007049 A1 | 1/2003 |
| WO | WO 03/100756 | 12/2003 |
| WO | WO 2004/068460 A1 | 8/2004 |
| WO | WO 2006/036421 | 4/2006 |
| WO | WO 2006/036524 | 4/2006 |
| WO | WO 2006/036559 | 4/2006 |
| WO | WO 2007/127046 | 11/2007 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani et al., "Surface micromachined tuneable interferometer array," Sensors and Actuators, pp. 17-23. (1994).
Austrian Search Report for U.S. Appl. No. 11/051,258, (Publication No. 2006/0077512), May 13, 2005.
Austrian Search Report for U.S. Appl. No. 11/083,841, (Publication No. 2006/0066557), Jul. 14, 2005.
Austrian Search Report for U.S. Appl. No. 11/118,110, (Publication No. 2006/0077148), Aug. 12, 2005.
Austrian Search Report for U.S. Appl. No. 11/118,605 (Publication No. 2006/0077149), Jul. 14, 2005.
Conner, "Hybrid Color Display Using Optical Interference Filter Array," SID Digest, pp. 577-580 (1993).
European Search Report and WO in European App. No. 05255635.4 dated Jan. 19, 2006 (Publication No. EU 1 640761).
European Search Report and WO in European App. No. 05255636.2 dated Apr. 28, 2006 (Publication No. EU 1 640762).
File History of U.S. Appl. No. 11/188,197, filed Jul. 22, 2005.
International Search Report for Application No. PCT/US05/032773 dated Jan. 10, 2006 (PCT Publication No. WO 2006/036559).
International Search Report for Application No. PCT/US2005/030526, mailed Dec. 30, 2005.
ISR and WO for PCT/US05/030526 dated Apr. 5, 2007 (PCT Publication No. WO 2006/036421).
ISR and WO for PCT/US2005/032773 dated Jan. 10, 2006 (PCT Publication No. WO 2006/036559).
ISR and Written Opinion for PCT/US05/032426 dated Jan. 11, 2006 (PCT Publication No. WO 2006/036524).
ISR and Written Opinion for PCT/US07/08790 dated Nov. 2, 2007 (PCT Publication No. WO 2007/127046).
MacLeod, "Thin Film Optical Filters," Third Edition, Institute of Physics Publishing, 2001, pp. 176-177.
MacLeod, "Thin-Film Optical Filteres", Institute of Physics Publishing, pp. 126-127(no. date available).
Manzardo et al., "Optics and Actuators for Miniaturized Spectrometers," International Conference on Optical MEMS, 12(6):23-24 (Dec. 2003).
Miles, et al., Digital Pater for Reflective Displays, Journal of SID, 11:1, pp. 209-215, 2003.
Miles, Interferometric Modulation: MOEMS as an Enabling Technology for High-Performance Reflective Displays, Proceedings of the SPIE, 4985:28, pp. 131-139, January 282, 2003.
Miles, Mark, W., "A New Reflective FPD Technology Using Interferometric Modulation", The Proceedings of the Society for Information Display (May 11-16, 1997).
Miles, MW "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.
Office Action in U.S. Appl. No. 11/118,605 dated May 15, 2008.
Official Communication for Chinese Application No. 200580030995.5, dated Mar. 7, 2008 (PCT Publication No. WO 2006/036421).
Official Communication for European App. No. 052555636.2 dated Jan. 19, 2006 (Publication No. EU 1 640762).
Official Communication for European App. No. 05255635.4 dated Jan. 19, 2005 (Publication No. EU 1 640761).
Official Communication for European App. No. 05255635.4 dated Oct. 12, 2006 (Publication No. EU 1 640 761).
Official Communication for European App. No. 05255636.2 dated Jan. 5, 2007 (Publication No. EU 1 640 762).
Official Communication for European App. No. 05255657.8 dated Dec. 7, 2005 (Publication No. EU 1 640 767).
Official Communication for European App. No. 05792314.6 dated Jul. 19, 2007 (PCT Publication No. WO 2006/036421).
Official Communication for European App. No. 06077032.8 dated Feb. 22, 2007 (Publication No. EU 1 767981).
Official Communication for European App. No. 06077032.8 dated May 25, 2007 (Publication No. EU 1 767981).
Official Communication in Chinese Patent App. No. 200510105830.1 dated May 9, 2008.
Official Communication in Chinese Patent App. No. 200510105840.5 dated May 9, 2008.
Official Communication in European App. No. 05792314.6 dated Aug. 6, 2008 (PCT Publication No. WO 2006/0363421).
Official Communication in Japanese App. No. 2005-259341 dated Oct. 7, 2008.
Official Communication in U.S. Appl. No. 11/118,110 dated Nov. 26, 2008.
Official Communication in U.S. Appl. No. 11/118,605 dated Dec. 15, 2008.
Response to Office Action in U.S. Appl. No. 11/118,605 dated Aug. 13, 2008.
Summons to Attend Oral Proceedings for European App. No. 05792314.6 dated Apr. 4, 2008 (PCT Publication No. WO 2006/036421).
Wyszecki & Stiles, "Color science: Concepts and methods, quantitative data and formulae." ISBN 0471399813, 2000, pp. 175-179.
Fu-Cheng et al. "Multivariable Robust Control for a Red-Green-Blue LED Lighting System", Power Electronics, IEEE Transactions on Feb. 2010, vol. 25 , Issue:2, pp. 417-428, ISSN : 0885-8993.
Kwon, O. S. et al., "High Fidelity Color Reproduction of Plasma Displays under Ambient Lighting", IEEE Transactions on Consumer Electronics, Aug. 2009, 55(3), 1015-1020.
Mark W. Miles, "Interferometric Modulation: A MEMS Based Technology for the Modulation of Light," Final Program and Proceedings IS&T's 50th Annual Conference, pp. 674-677, 1997.
Extended European Search Report in Application No. 06077032.8 (Publication No. EP 1 767 981) dated May 25, 2007.
International Preliminary Report on Patentability in Application No. PCT/US2005/030526, dated Mar. 27, 2007.
Response to Office Action in U.S. Appl. No. 11/118,110, dated Feb. 26, 2009.
Office Action in U.S. Appl. No. 11/118,110, dated May 14, 2009.
Response to Office Action in U.S. Appl. No. 11/118,110, dated Nov. 12, 2009.
Final Office Action in U.S. Appl. No. 11/118,110, dated Dec. 18, 2009.
Request for Continued Examination in U.S. Appl. No. 11/118,110, dated Mar. 18, 2010.
Office Action in U.S. Appl. No. 11/118,110, dated Apr. 30, 2010.

Response to Office Action in U.S. Appl. No. 11/118,110, dated Aug. 30, 2010.
Final Office Action in U.S. Appl. No. 11/118,110, dated Nov. 30, 2010.
Examiner Interview Summary in U.S. Appl. No. 11/118,605, dated Feb. 20, 2009.
Request for Continued Examination, Amendment, Applicant Summary of Interview with Examiner in U.S. Appl. No. 11/118,605, dated Mar. 16, 2009.
Restriction Requirement in U.S. Appl. No. 11/118,605, dated Apr. 10, 2009.
Amendment in U.S. Appl. No. 11/118,605, dated May 11, 2009.
Office Action in U.S. Appl. No. 11/118,605, dated Jul. 9, 2009.
Examiner Interview Summary in U.S. Appl. No. 11/118,605, dated Dec. 8, 2009.
Amendment in U.S. Appl. No. 11/118,605, dated Dec. 9, 2009.
Office Action in U.S. Appl. No. 11/118,605, dated Mar. 2, 2010.
Request for Continued Examination and Amendment in U.S. Appl. No. 11/118,605, dated Aug. 2, 2010.
Examiner Interview Summary in U.S. Appl. No. 11/118,605, dated Aug. 2, 2010.
Official Communication in Australian Application No. 2005204236, dated Dec. 14, 2009.
Office Action in Chinese Application No. 200510105830.1, dated Feb. 20, 2009.
Office Action in Chinese Application No. 200510105830.1, dated Jun. 4, 2010.
Official Communication in Chinese Application No. 200510105840, dated Feb. 27, 2009.
Office Action in European Application No. 05255635.4 dated Mar. 1, 2010.
Official Communication in European Application No. 05 255 636.2, dated Mar. 1, 2010.
Office Action in Japanese Application No. 2005-276235 mailed May 12, 2009.
Official Communication in Mexican Application No. PA/a/2005/010238 dated Jan. 22, 2008.
Office Communication in Mexican Application No. PA/a/2005/010238 dated May 7, 2008.
Office Communication in Mexican Application No. PA/a/2005/010238 dated Jul. 16, 2008.
Office Communication in Mexican Application No. PA/a/2005/010238 dated Dec. 1, 2008.
Office Communication in Mexican Application No. PA/a/2005/010238 mailed Feb. 26, 2009.
Official Communication in Mexican Application No. PA/a/2005/009863 dated Apr. 4, 2008.
Office Action in Malaysian Application No. PI20054365 mailed Dec. 31, 2009.
Official Communication European Application No. 06077032, dated Mar. 1, 2010.
Office Action in Russian Application No. 2005129978 mailed Sep. 23, 2009.
Office Action in U.S. Appl. No. 11/188,197, dated Jun. 25, 2007.
Amendment in U.S. Appl. No. 11/188,197, dated Nov. 26, 2007.
Notice of Allowance in U.S. Appl. No. 11/188,197, dated Jan. 11, 2008.
Request for Continued Examination and Information Disclosure Statement in U.S. Appl. No. 11/188,197, dated Apr. 10, 2008.
Notice of Allowance in U.S. Appl. No. 11/188,197, dated Jul. 9, 2008.
Request for Continued Examination and Information Disclosure Statement in U.S. Appl. No. 11/188,197, dated Oct. 8, 2008.
Notice of Allowance in U.S. Appl. No. 11/188,197, dated Dec. 18, 2008.
Examiner Interview Summary in U.S. Appl. No. 11/188,197, dated Feb. 10, 2009.
Applicant Interview Summary in U.S. Appl. No. 11/188,197, dated Mar. 9, 2009.
Comments on Statement of Reasons for Allowance in U.S. Appl. No. 11/188,197, dated Mar. 17, 2009.
Mark W. Miles, "MEMS-based Interferometric Modulator for Display Applications," Proceedings of SPIE Micromachined Devices and Components, pp. 20-28, 1999.
Notice of Abandonment in U.S. Appl. No. 11/118,110, dated Jun. 10, 2011.
Preliminary Amendment in U.S. Appl. No, 13/036,890, dated May 24, 2011.
Office Action in U.S. Appl. No. 11/118,605, dated Apr. 4, 2011.
Amendment in U.S. Appl. No. 11/118,605, dated Jul. 5, 2011.
Office Action in U.S. Appl. No. 11/118,605, dated Jul. 29, 2011.
Office Action in Japanese Application No. 2005-276235 dated Apr. 5, 2011.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

METHOD AND DEVICE FOR GENERATING WHITE IN AN INTERFEROMETRIC MODULATOR DISPLAY

CROSS-REFERENCE TO RELATED APPLICATIONS

This application is a continuation of U.S. application Ser. No. 11/188,197, filed on Jul. 22, 2005, which claims priority to U.S. Provisional Patent Application No. 60/613,504, filed on Sep. 27, 2004, both of which are hereby incorporated by reference in their entirety.

BACKGROUND

1. Field of the Invention

The field of the invention relates to microelectromechanical systems (MEMS).

2. Description of the Related Technology

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

In certain embodiments, an array of interferometric modulators are configured to appear to have a white color. The array comprises a first plurality of color interferometric modulators wherein each modulator reflects a first color light, a second plurality of color interferometric modulators wherein each modulator reflects a second color light, and wherein the reflected light from the first plurality of color interferometric modulators and the second plurality of color interferometric modulators when combined together appear substantially white.

In certain embodiments, a method selects wavelengths for a first plurality of interferometric modulators and a second plurality of interferometric modulators so that a combination of the reflected light has the color of white. The method comprises selecting a first plurality of interferometric modulator display elements that reflects a first color light and selecting a second plurality of interferometric modulator display elements that reflects a second color light, wherein the second color light is complementary to the first color light such that said first color light and said second color light when combined appear substantially white.

In certain embodiments, a method displays a region of an image having a white color. The method comprises reflecting a first color light from a first plurality of color interferometric modulators, the first color light having a first center wavelength and reflecting a second color light from a second plurality of color interferometric modulators, the second color light having a second center wavelength in the region that is complementary to the first center wavelength.

In certain embodiment, an array of light modulators is arranged at intersections of rows and columns of first and second electrodes. The array comprises a first light modulator forming a first resonant optical cavity at a first intersection of the first and second electrodes, the first resonant optical cavity being configured to reflect light having a first wavelength and a second light modulator forming a second resonant optical cavity at a second intersection of the first and second electrodes, the second resonant optical cavity being configured to reflect light having a second wavelength, wherein the light reflected by the first cavity and the light reflected by the second cavity are complementary and produce a substantially white color when combined together.

In certain embodiments, an apparatus displays a region of an image having a white color. The apparatus comprises means for reflecting light having a first color in the region and means for reflecting light at a second color in the region, wherein said second color is substantially complementary to the first color.

DETAILED DESCRIPTION OF PREFERRED EMBODIMENTS

Figure 1:
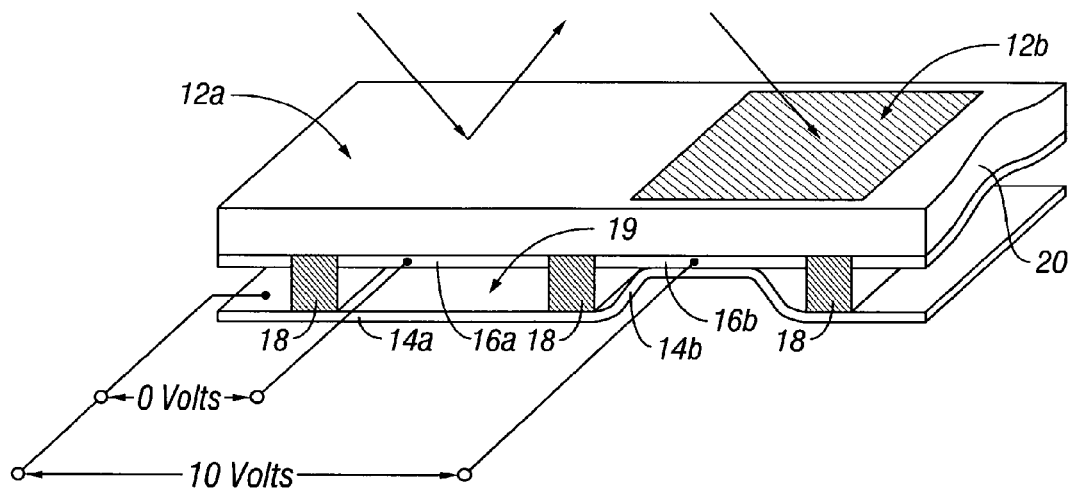
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

Interferometric modulators can be arranged in arrays to produce a color display. Generation of the color white in a display can also be accomplished. For example, the color white may be generated through the combination of two interferometric modulators types, each capable of reflecting light at a wavelength complementary to the other. By combining the reflected light from the two modulator types, the resulting light appears to have the color white. For example, an array may comprise a first plurality of color interferometric modulators. Each modulator in the first plurality may reflect a first color light. The array may further comprise a second plurality of color interferometric modulators configured to reflect a second color light. The reflected light from the first plurality of color interferometric modulators and the second plurality of color interferometric modulators, when combined together, appear substantially white.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Light with the color white can be perceived in a display through the use of MEMS devices. In certain embodiments, two different interferometric modulators are used in combination to generate the color white even though each of the two interferometric modulators does not appear white when reflecting light individually. The wavelengths of light reflected by each modulator are selected such that when the modulators are both in the bright state and viewed together, the color white is perceived. By selecting the two MEMS devices to be complimentary so as to display white when combined, a minimum of two different modulators is needed in order to create a display capable of displaying the color white along with displaying some other colors. In many embodiments, a display will comprise a plurality of the first type of interferometric modulator and a second plurality of the second type of interferometric modulator. Such a display may reflect light having a first wavelength according to the first type of interferometric modulator, light having a second wavelength according to the second type of interferometric modulator, and light having the wavelength of the color white.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b. The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
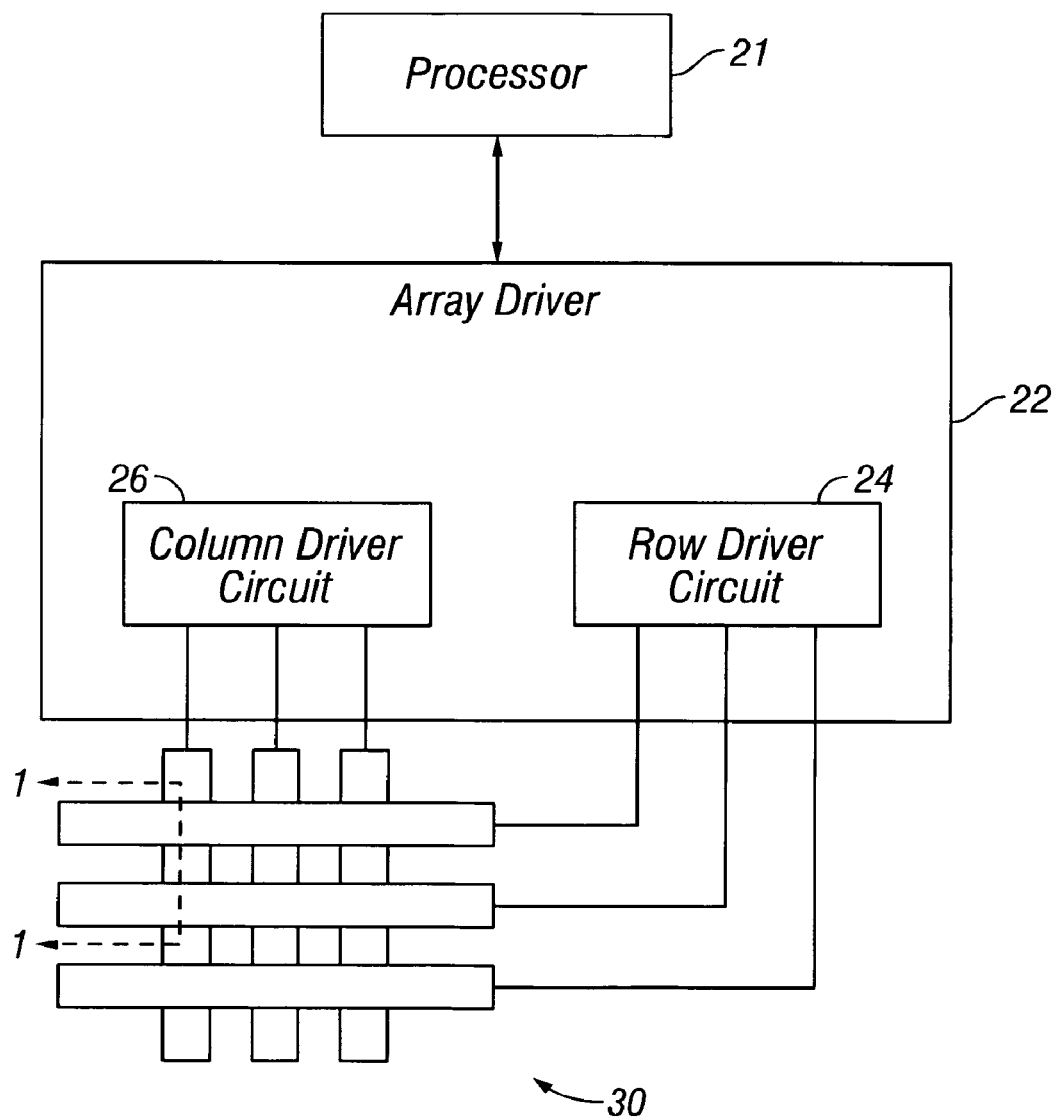
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
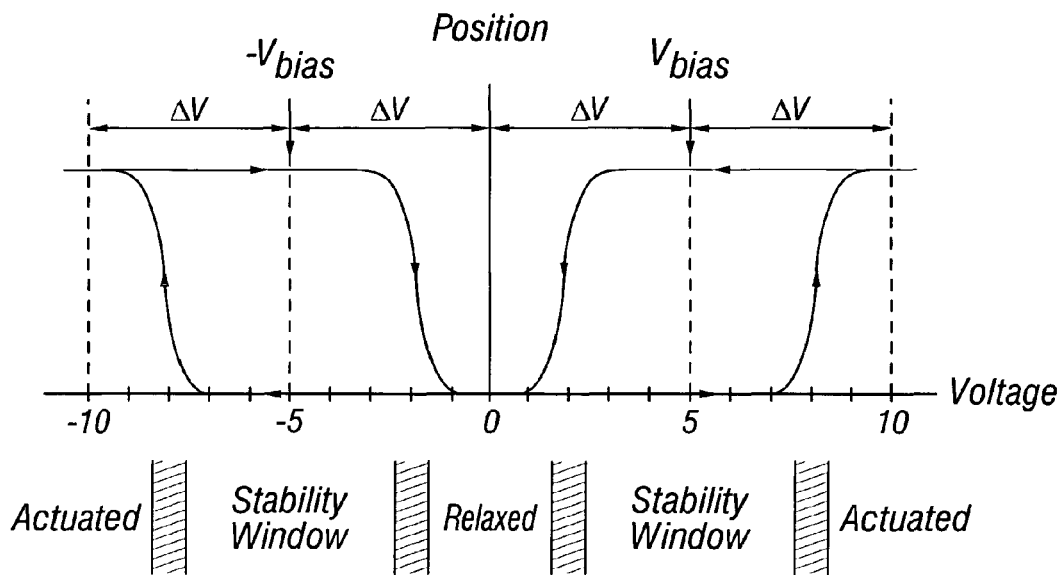
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
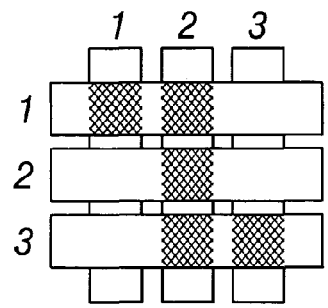
FIGS. 5A and 5B illustrate one exemplary timing diagram for row and column signals that may be used to write a frame of display data to the 3×3 interferometric modulator display of FIG. 2.
Figure 5B:
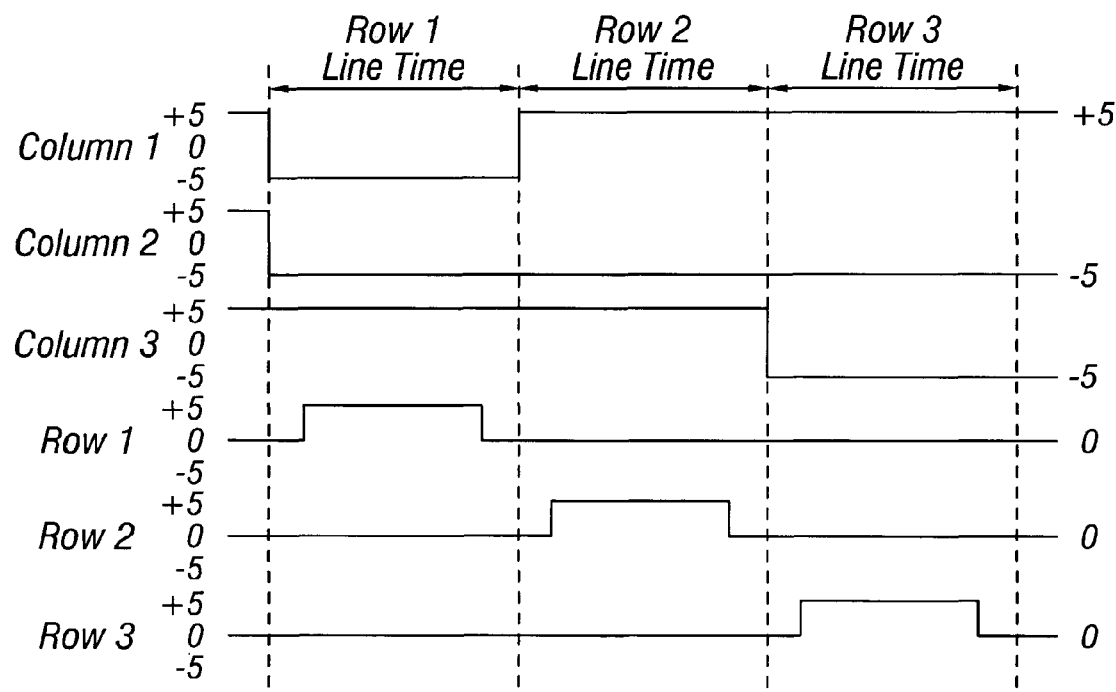

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
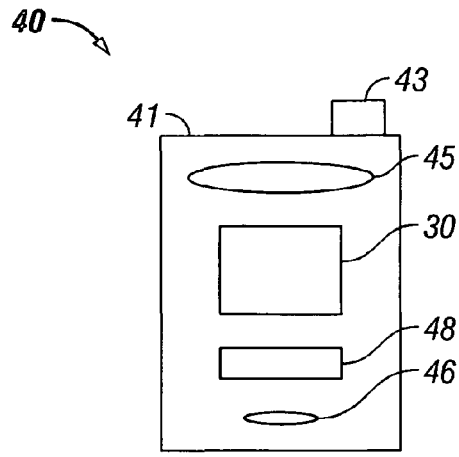
FIGS. 6A and 6B are system block diagrams illustrating an embodiment of a visual display device comprising a plurality of interferometric modulators.
Figure 6B:
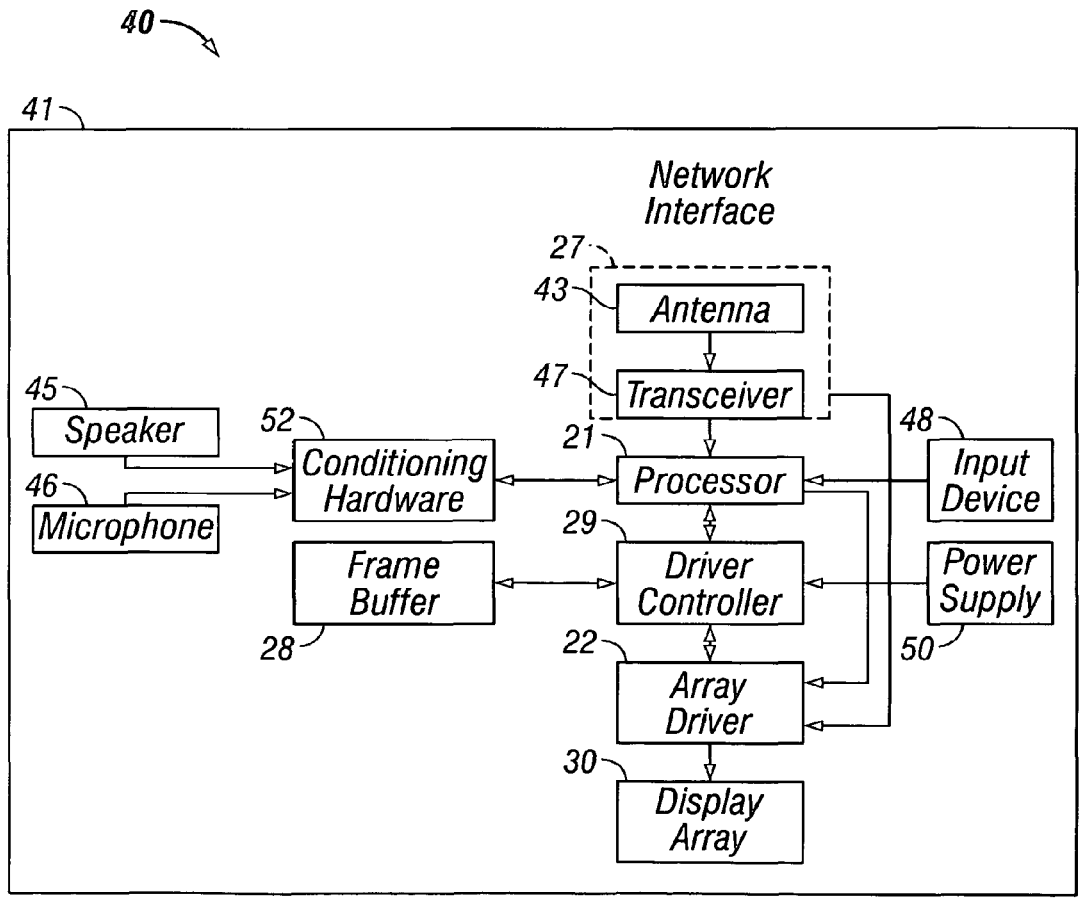

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
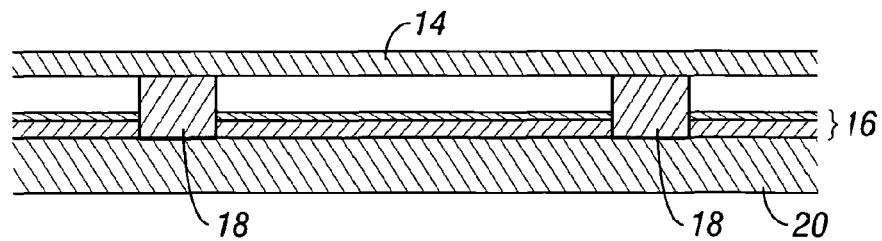
FIG. 7A is a cross section of the device of FIG. 1.
Figure 7B:
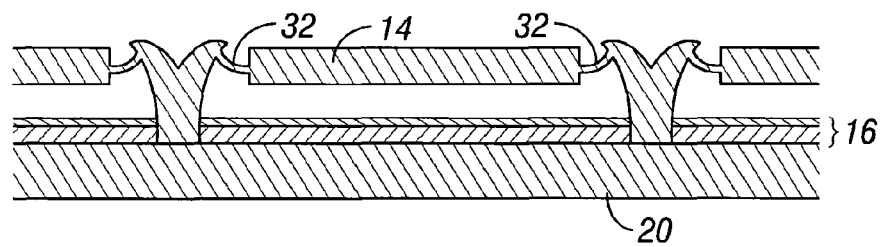
FIG. 7B is a cross section of an alternative embodiment of an interferometric modulator.
Figure 7C:
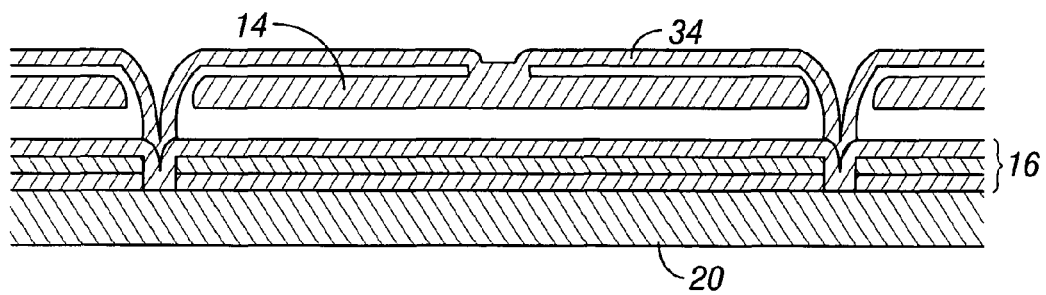
FIG. 7C is a cross section of another alternative embodiment of an interferometric modulator.
Figure 7D:
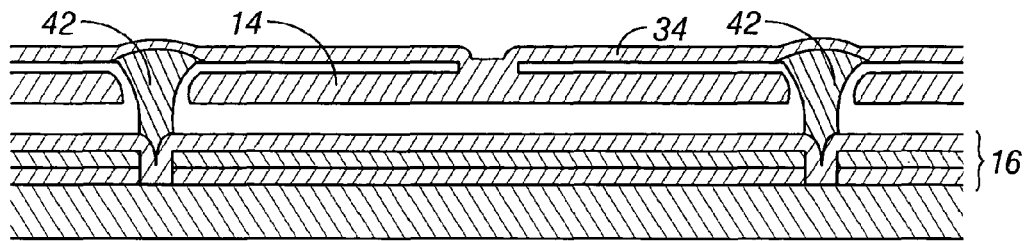
FIG. 7D is a cross section of yet another alternative embodiment of an interferometric modulator.
Figure 7E:
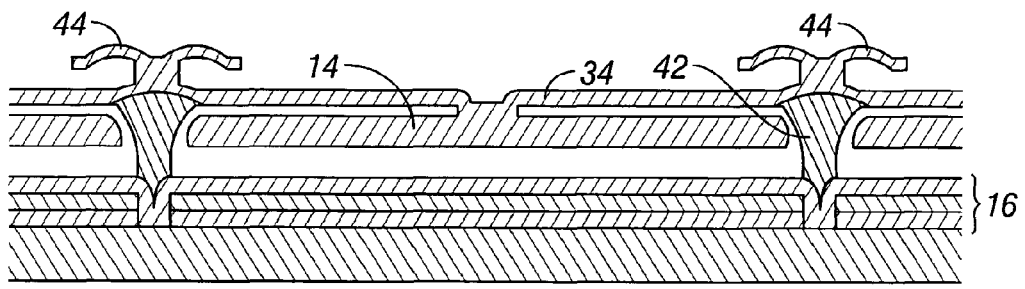
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Various embodiments of display devices described herein can accurately reproduce light of any color. Light appears to have a white color when it is devoid of hue (achromatic). Light appears to have a non-white color when it takes on a specific hue (chromatic). The color of light at a single wavelength is said to be a monochromatic color. The generation of an arbitrary color can be accomplished by having a monochromatic light source with exactly that wavelength. Alternatively, the same arbitrary color may be perceived by a viewer when the light from two or more different monochromatic sources at different intensities are combined. Mixing different sets of light wavelengths can sometimes produce the same or substantially the same resulting perceived color effect. For example, mixing blue and yellow light of equal intensity produces light appearing to have a white color; as does mixing red and blue-green light. These combinations have different spectral distributions, but the perceived result appears the same. Any two colors that mix with the proper intensities to produce the color white are said to be complementary.

Figure 8:
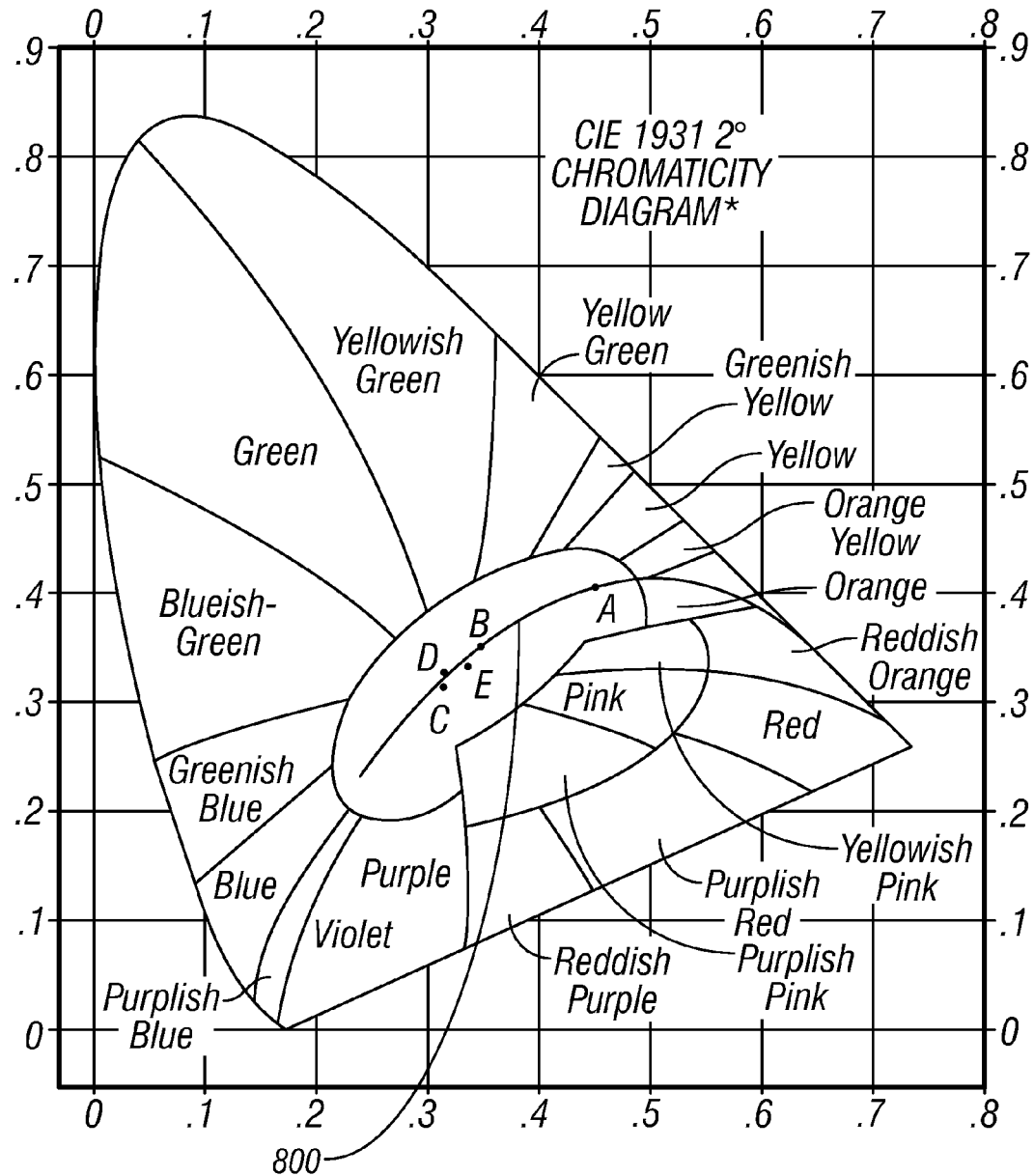
FIG. 8 is a chromaticity diagram illustrating the effects of combining colors to generate white.

The 1931 CIE chromaticity diagram illustrated in FIG. 8 includes regions having different hues or colors. For example, green, blue, red, yellow, and white regions are shown. The closer a color is to a spectrum locus, the more saturated is the color. In FIG. 8, wavelengths are given in microns ($\mu$m). In the CIE system, the intensities of red, green, and blue are transformed into what are called the tristimulus values, which are represented by the capital letters X, Y, and Z. These values represent the relative quantities of the primary color that are perceived as the color at the location of these coordinates on the chromaticity diagram. The coordinates X, Y, and Z are called chromaticity coordinates, and they always add up to 1 (i.e., $x+y+z=1$).

The CIE system provides a curved line 800 that starts in the orange section of the diagram and extends to the left and downward until it ends in the desaturated part of the blue region. This line 800 represents the color temperatures of the ideal blackbody radiator. It is sometimes called the blackbody or Planckian locus. A blackbody radiator is a theoretical object that absorbs 100% of the radiation incident thereon while being able to emit the maximum amount of energy possible for a particular temperature. Certain points along the Planckian locus are labeled with the corresponding color temperature in Kelvin. As may be seen, if a blackbody is heated to 1900 K, it glows orange. As the temperature increases, the color of the radiated light moves to yellow, then white, and finally to blue.

There are also five points on or near the Planckian locus, labeled A, B, C, D, and E. These points represent different standard illumination sources (called reference illuminants) for photography and filming, as established by the CIE. These illuminants emit spectral distributions that are similar to blackbody radiators, and they are used to simulate daylight and produce other well-defined colors. Point A is defined as the color of a blackbody radiator at 2856 K. The other points represent various correlated color temperatures. For example, point D represents a correlated color temperature of 6500 K and is often referred to as D6500 or D65. Light that is on or close to the reference illuminants or pale in hue saturation is considered to be substantially white.

Figure 9:
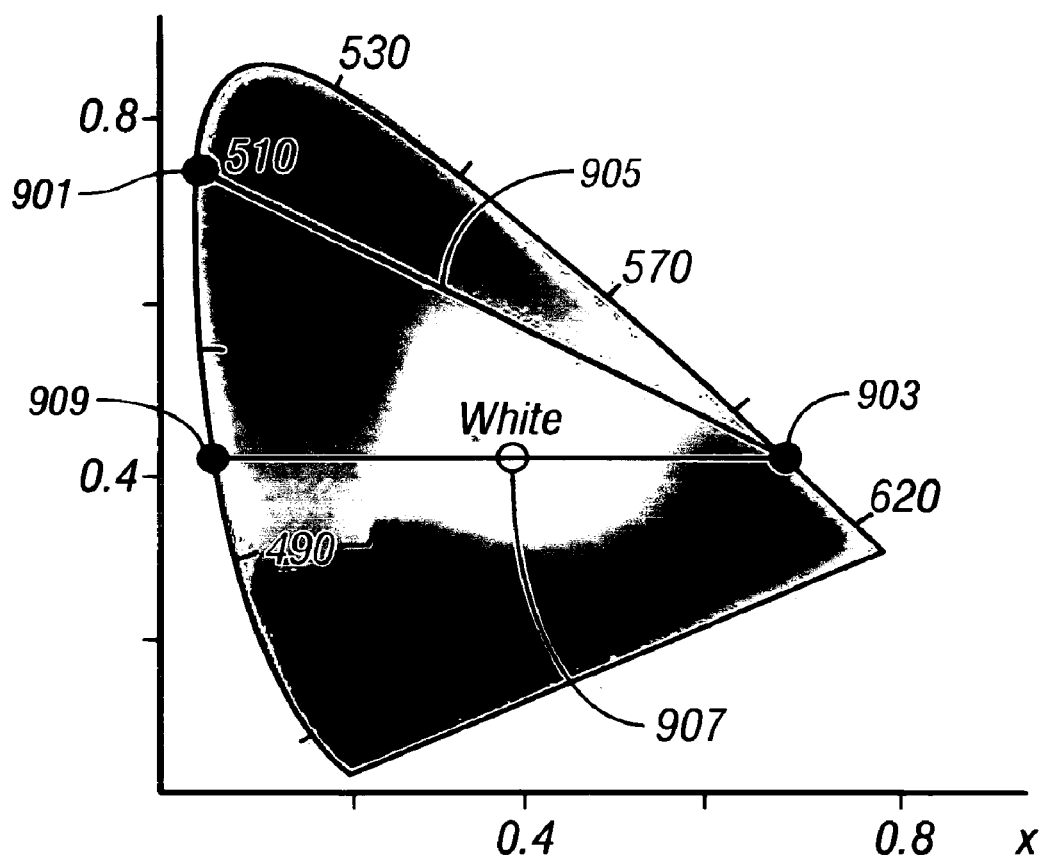
FIG. 9 is a chromaticity diagram illustrating a method for selecting colors that when combined generate another color.

FIG. 9 is a chromaticity diagram illustrating a method for selecting colors that when combined are perceived as another color. While the two colors selected for this example are not complementary in that the colors, when combined, do not generate white, the example is instructive in creating embodiments having complementary colors.

To begin, any two points are selected on the chromaticity chart, for example, of FIG. 9. The selected points may be located on the outer spectrum locus or within the chromaticity chart. The color corresponding to each of the selected points may or may not be monochromatic.

For example, point 903 corresponding to 600 nm (reddish orange) and point 901 corresponding to 510 nm (green) are selected. A straight line is then drawn between the two selected points. Continuing with the example, line 905 is drawn between points 901, 903. As can be seen, line 905 passes through several hue regions. Mixing different intensities of light at 600 nm, point 903, and 510 nm, point 901, can generate any color through which line 905 passes. In this example, orange, orange-yellow, yellow, yellow-green, and yellowish green, can be generated in addition to the end points 903, 901 of reddish orange and green, respectively.

Similarly any two points or colors connected by a line that passes through white region 907 can be combined in suitable proportions to generate the color white. Examples are well known in the art whereby pairs of monochromatic complementary light are combined to generate a color corresponding to a specific reference illuminant white. See *Color Science Concepts and Methods, Quantitative Data and Formulae*, G. Wyszecki and W. S. Stiles (Wiley-Interscience 2000). For example, the CIE reference illuminant D65 can be generated by pairing one monochromatic light at a wavelength (w1) of 480 nm with a second monochromatic light (w2) at a wavelength of 578 nm in a radiant power ratio ($P_{w1}/P_{w2}$) of 0.642. Alternatively, the same D65 can be generated by pairing one monochromatic light at a wavelength of 680 nm with a second monochromatic light at a wavelength of 493.3 nm in a radiant power ratio of 0.147. Two colors are substantially complementary to each other when the resulting color white is on or close to the reference illuminants or substantially pale in hue saturation.

An interferometric modulator 12a (see FIG. 1) is designed to reflect light at a specific predetermined wavelength depending upon the material and geometry of the modulator as discussed above. As illustrated in FIG. 5A, an array of interferometric modulators 12a or pixels (1,1), (1,2), (2,2), (3,2) and (3,3) may be placed together to form a display.

In certain embodiments, at least a portion of the display comprises an array of interferometric modulators 12a. The array is comprised of at least two interferometric modulator 12a types. Each type of interferometric modulator 12a is capable of displaying a monochromatic color, for example, with its cavity open, or black, when in an actuated state with its cavity closed. The wavelength of light reflected by the first modulator type is selected to be complementary to the wavelength of light reflected by the second modulator type. When the two types of interferometric modulators 12a are both in their bright state at the same time, the combined light reflected to the user appears to be the color white and not the color that would be perceived if each modulator type was in the bright state exclusive of the other.

In practice, a given interferometric modulator 12a, or an array of such modulators, may not reflect light at precisely the single wavelength it was designed to reflect. Instead, a given interferometric modulator 12a may reflect a range of wavelengths of light around the design wavelength. In certain embodiments, the perceived color is substantially white, so long as the center wavelengths of light from the two types of interferometric modulator types are complementary or substantially complementary to each other.

In order to generate the perception of the color white, the reflected light of the two complementary wavelengths are reflected in the appropriate intensities. In one embodiment, varying the intensity of each light color is achieved by increasing or decreasing the surface areas of the display that correspond to the two interferometric modulator types. For example, the intensity of the light color of the first modulator type can be increased relative to the intensity of the second modulator type by having a greater number of first modulator types or by having modulators with larger reflective area than the second modulator type. In another embodiment, varying the intensity of each light color is achieved by variable pulse width activation of the modulators, whereby the duration of the pulse is in proportion to the intensity desired. For example, the intensity of the light color of the first modulator type can be increased relative to the intensity of the second modulator type by keeping the first modulator type in an open, reflective state longer than the second modulator type. By pulsing the opening of the first modulator type at a rate different than the second modulator type, the desired relative intensities is obtained. In another embodiment, both variable pulsed width actuation and variable surface areas are used in combination to achieve the desired relative intensities. In another embodiment, filters, such as, e.g. neutral density and color filters, may also be used to attenuate and/or control the reflected intensities.

As illustrated in FIGS. 8 and 9, traditional colors such as red, blue, or green need not be selected for one or both of the two types of interferometric modulators to create white. Instead, the colors chosen can be non-traditional color, that is, colors which are generally not chosen for their ease to create a wide gamut of other colors. Thus, combining the correct intensities of monochromatic purplish-blue light (light at a wavelength in the region close to around 470-490 nm) with monochromatic greenish-yellow light (light at a wavelength in the region close to around 570-600 nm) can produce light with the color white. This is useful as complementary colors created from non-traditional colors may be easier to generate or manipulate than traditional colors.

By providing only two colors or types for the modulators of the display, the cost of the display can be reduced through a reduction in the number of processing and mask steps. Typically, a display having fewer types of interferometric modulators is less costly to manufacture than displays having three or more types of interferometric modulators. For example, an apparatus and method of fabrication as described above may be employed once the materials and geometries for the two types of interferometric modulators are selected based on their combined capacity to generate the color white.

Figure 10:
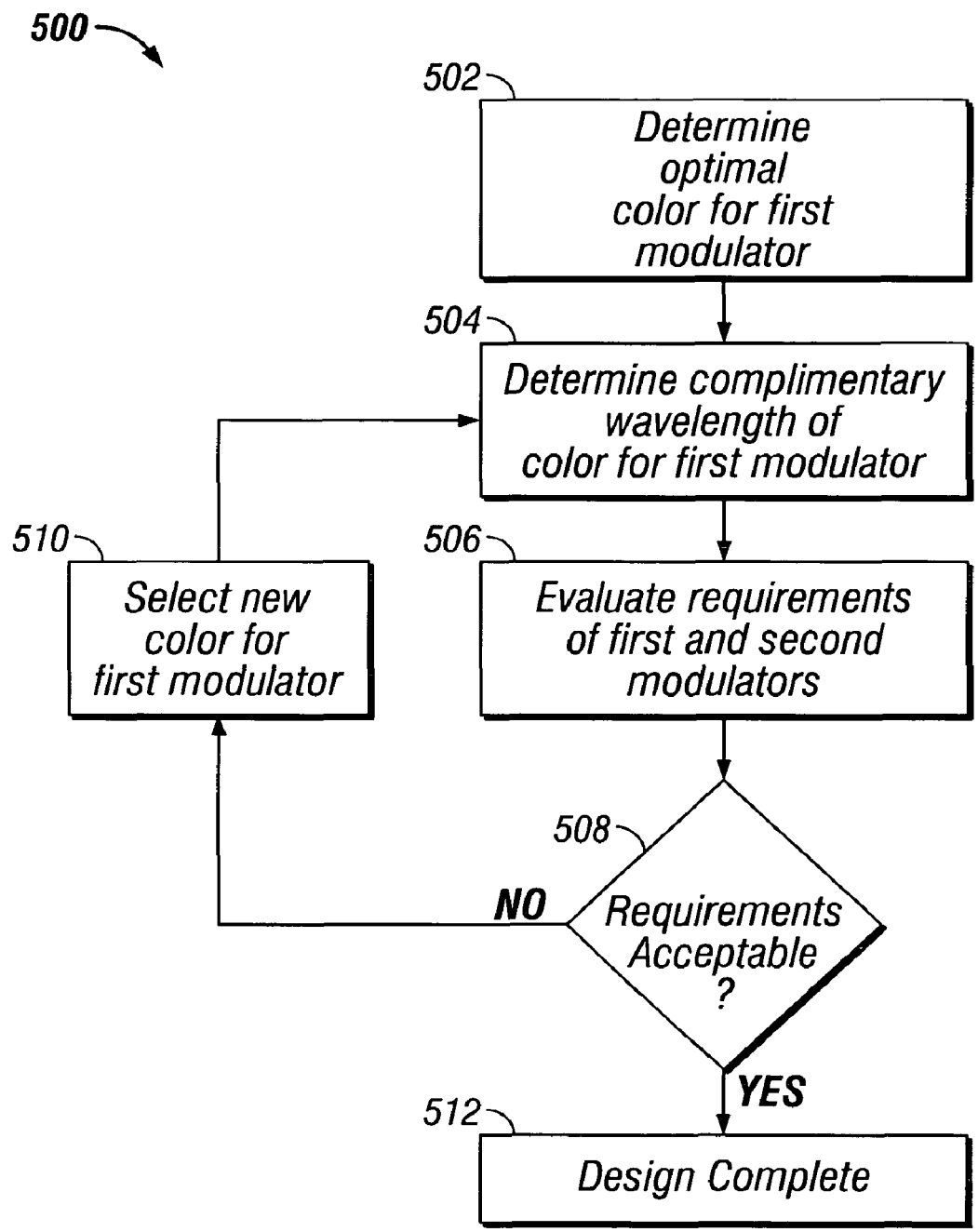
FIG. 10 is a flowchart describing an exemplary method for selecting a two color array of MEMS devices that generates the color white.

FIG. 10 is a flowchart 100 describing a methodology for determining the materials and dimensions of the two types of interferometric modulators 12a in an array of interferometric modulators. The process begins at block 502 where a candidate color for the first modulator type is selected. This selection may, for example, be based on the monochrome aspects of that color as far as ability to be viewed under different environmental conditions, on its mixing properties with other colors, and on the efficiency by which it is actuated. In block 504, the second color is determined. This second color is preferably complimentary to the color of the first modulator type selected at block 502. This step can be illustrated with reference back to FIG. 9. For example, the candidate for the first color is selected to be the color represent by point 903 in the chromaticity diagram, which corresponds to light having a wavelength of roughly 605 nm. By drawing a straight line 909 through point 903 and point 907 which represents the color white, the second color is determined to be at the wavelength found at point 909. In this example, point 909 corresponds to light having a wavelength of roughly 500 nm. Alternatively, the candidate second color can be determined with reference to tables of known complementary color pairs.

Returning to block 506 in FIG. 10, the design choice is evaluated. It may be found that this combination of colors is not acceptable. The combination may not be acceptable if, for example, the display must reflect some form of monochromatic green which is not capable of being generated with either one of the two colors corresponding to points 903, 909 in FIG. 9. A combination may also be found unacceptable due to difficulty in manufacturing one or more of the two types of interferometric modulators. The activation voltage associated with the second type of interferometric modulator may also render the color selection at block 504 unacceptable. At block 506, an alternative second color can be used to correct the deficiency.

Next at a decision block 508, the method determines if the second color satisfies the design requirements. If the second color does not satisfy the design requirements and an alternative second color does not satisfy the design requirements, the process moves to block 510 where a new color is selected for the first modulator type. This color may be similar to or different than the originally chosen first color. The process then moves to the block 504 and continues as described above. The process repeats until an acceptable design is achieved and the design is accepted in block 512.

Returning to decision block 508, if the second color satisfies the design requirements, the process moves to block 512.

Figure 11:
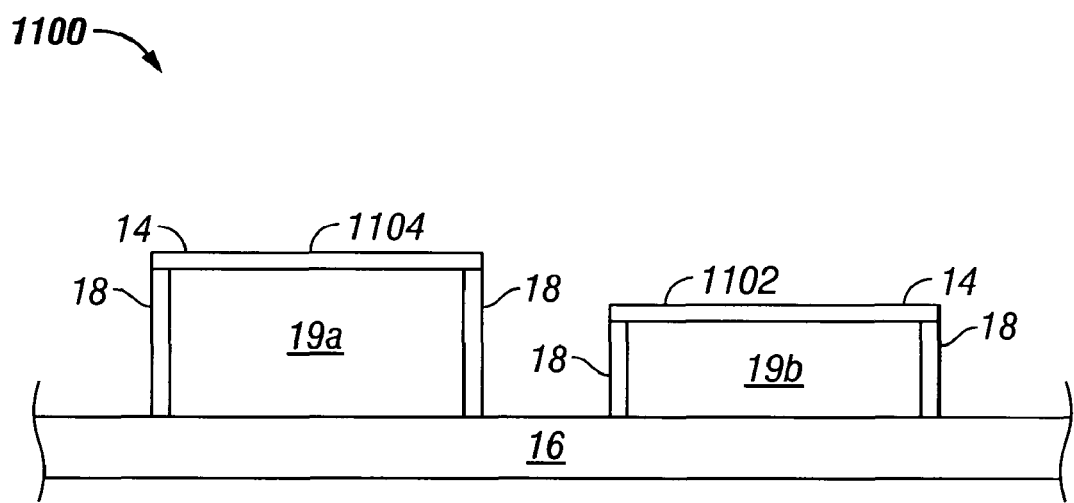
FIG. 11 is a diagram illustrating an exemplary array of two MEMS devices with optical responses selected in accordance with the flowchart of FIG. 10.

FIG. 11 illustrates an exemplary two modulator display device 1100 having a first interferometric modulator type 1104 and a second interferometric modulator type 1102. The design of the optical stack 16 and movable reflective layer 14 are as described above. The movable reflective layers 14 are separated from the optical stacks 16 by a defined gap 19a, 19b. The gaps 19a, 19b in conjunction with optical stacks 16 determine the optical response of each interferometric modulator 1102, 1104. As describe with reference to FIG. 10, the distance of the gaps 19a, 19b are selected to provide wavelengths of light complementary to each other.

By designing the array to comprise interferometric modulators that reflect two colors and by restricting those colors to be complementary, a low cost display with white display capability is provided.

A wide range of variation in the designs and methods used are also possible. In some embodiments, for example, light modulator elements that do not produce a truly monochromatic output may be used. Accordingly, one or both of the chromaticity points may not be situated on the outer locus of the chromaticity charts. Still other variations are possible.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, certain embodiments may be embodied within a form that does not provide all of the features and benefits set forth herein, as some features may be used or practiced separately from others.

What is claimed is:

1. An array of interferometric modulators configured to appear to have a white color, the array comprising:
   a first plurality of color interferometric modulators wherein each modulator of the first plurality reflects a first color light that is substantially the same first color light; and
   a second plurality of color interferometric modulators wherein each modulator of the second plurality reflects a second color light that is substantially the same second color light, the first color light different from the second color light,
   wherein the combined reflected light from only the first plurality of color interferometric modulators and only the second plurality of color interferometric modulators appears substantially white.

2. The array of claim 1, wherein only said first and second pluralities of interferometric modulators are included in said array.

3. The array of claim 1, wherein the white color is the color of a blackbody radiator between 2856 K and 6500 K.

4. The array of claim 1, wherein the first plurality of interferometric modulators and the second plurality of interferometric modulators are arranged to form at least a portion of a display.

5. The array of claim 1, further comprising:
   a processor that is in electrical communication with at least one of said first plurality of color interferometric modulators and said second plurality of color interferometric modulators, said processor being configured to process image data; and
   a memory device in electrical communication with said processor.

6. The array of claim 5, further comprising:
   a first controller configured to send at least one signal to at least one of said first and second plurality of color interferometric modulators; and
   a second controller configured to send at least a portion of said image data to said first controller.

7. The array of claim 6, further comprising an image source configured to send said image data to said processor.

8. The array of claim 7, wherein said image source comprises at least one of a digital video disc drive (DVD) and a hard-disc drive.

9. The array of claim 8, further comprising an input device configured to receive input data and to communicate said input data to said processor.

10. The array of claim 6, further comprising a network interface configured to communicate over a network.

11. The array of claim 10, wherein said network interface includes at least one of a transceiver and a receiver.

12. A method of selecting wavelengths for a first plurality of interferometric modulators and a second plurality of interferometric modulators so that a combination of reflected light has the color of white, the method comprising:
- selecting a first plurality of interferometric modulator display elements that reflects a first color light, the first color light being substantially the same first color light for each of the first plurality of interferometric modulator display elements; and
- selecting a second plurality of interferometric modulator display elements that reflects a second color light, the second color light being substantially the same second color light for each of the second plurality of interferometric modulator display elements, the second color light different from the first color light,
- wherein the second color light is complementary to the first color light such that said first color light and said second color light when combined from only the first plurality of interferometric display elements and only the second plurality of interferometric modulator display elements appear substantially white.

13. The method of claim 12, wherein only said first and said second pluralities of interferometric modulator display elements are included in an array.

14. The method of claim 12, wherein the white color is the color of a blackbody radiator between 2856 K and 6500 K.

15. An array of interferometric modulators manufactured by the method of claim 12.

16. A method of displaying a region of an image having a white color, the method comprising:
- reflecting a first color light from a first plurality of color interferometric modulators, said first color light being substantially the same first color light for each of the first plurality of interferometric modulators, said first color light having a first center wavelength; and
- reflecting a second color light from a second plurality of color interferometric modulators, the second color light being substantially the same second color light for each of the second plurality of interferometric modulators, said second color light different from said first color light, said second color light having a second center wavelength in the region that is complementary to the first center wavelength such that the combined reflected light from only said first plurality of color interferometric modulators and only said second plurality of color interferometric modulators appears substantially white.

17. The method of claim 16, wherein only said first and said second pluralities of interferometric modulators are included in an array.

18. An apparatus for displaying a region of an image having a white color, the apparatus comprising:
- means for reflecting light having a first color in the region; and
- means for reflecting light at a second color in the region,
- wherein said second color is substantially complementary to the first color such that a substantially white color is produced when light reflected from only the first color reflecting means and light reflected from only the second color reflecting means is combined together.

19. The apparatus of claim 18, wherein the first color reflecting means comprises a first interferometric modulator.

20. The apparatus of claim 18, wherein the second color reflecting means comprises a second interferometric modulator.

21. The apparatus of claim 18, wherein only a first plurality of said first color reflecting means and a second plurality of said second color reflecting means are included in an array.

* * * * *

UNITED STATES PATENT AND TRADEMARK OFFICE
CERTIFICATE OF CORRECTION

PATENT NO.         : 8,098,431 B2
APPLICATION NO.    : 12/427670
DATED              : January 17, 2012
INVENTOR(S)        : Philip D. Floyd It is certified that error appears in the above-identified patent and that said Letters Patent is hereby corrected as shown below:

At column 5, line 44, please delete "Pentium IV," and insert therefore, --Pentium IV®,--.

At column 11, line 57, please delete "Science" and insert therefore, --Science:--.

At column 16, line 2, in Claim 16, please delete "said" and insert therefore, --the--.

Signed and Sealed this
Twelfth Day of June, 2012

David J. Kappos
*Director of the United States Patent and Trademark Office*